United States Patent
Miyahara et al.

(10) Patent No.: US 6,708,774 B2
(45) Date of Patent: Mar. 23, 2004

(54) CULTIVATOR

(75) Inventors: Kazuyoshi Miyahara, Wako (JP); Hideaki Kobayashi, Wako (JP)

(73) Assignee: Honda Giken Kogyo Kabushiki Kaisha, Kabushiki (JP)

( * ) Notice: Subject to any disclaimer, the term of this patent is extended or adjusted under 35 U.S.C. 154(b) by 0 days.

(21) Appl. No.: 10/367,137

(22) Filed: Feb. 14, 2003

(65) Prior Publication Data

US 2003/0155138 A1 Aug. 21, 2003

(30) Foreign Application Priority Data

Feb. 21, 2002 (JP) .................................. 2002-045133
Feb. 21, 2002 (JP) .................................. 2002-045234

(51) Int. Cl.[7] .............................................. B62D 51/06
(52) U.S. Cl. ..................... 172/42; 172/103; 172/123; 172/125; 192/3.51
(58) Field of Search ........................ 172/35, 41, 42, 172/103, 104, 118, 119, 122, 123, 125; 192/3.51–3.63

(56) References Cited

U.S. PATENT DOCUMENTS 5,482,432 A * 1/1996 Paliwoda et al. ........ 415/168.2
5,934,234 A * 8/1999 Shichinohe et al. ..... 123/90.31

\* cited by examiner

Primary Examiner—Christopher J. Novosad
(74) Attorney, Agent, or Firm—Adams & Wilks (57) ABSTRACT

Driving worm provided on a transmission shaft, driven worm wheel provided on a cultivating shaft, main shaft portion of the transmission shaft and clutch are collectively accommodated in a transmission casing, which includes first and second bearings for preventing the clutch and driving gear from being displaced toward each other. The main shaft portion is screw-coupled to the clutch and a direction in which the screw-coupling between the main shaft portion and the clutch is tightened corresponds to only one rotational direction of an engine. The casing has a single opening for inserting therein the worm and worm wheel, and the opening is closed with a lid that also functions to prevent the worm from coming off the casing.

4 Claims, 9 Drawing Sheets

CULTIVATOR

FIELD OF THE INVENTION

The present invention relates to cultivating machines or cultivators which, though rotations of cultivating claws provided on a cultivating shaft, not only cultivate the ground but also travel in directions instructed by a human operator; such machines are commonly called "front-tine cultivators." Such cultivators are popularly used today because of their handiness and capability of making small sharp turns. Typical example of the conventionally-known cultivators is discussed below in relation to FIG. 9.

BACKGROUND OF THE INVENTION

Figure 9:
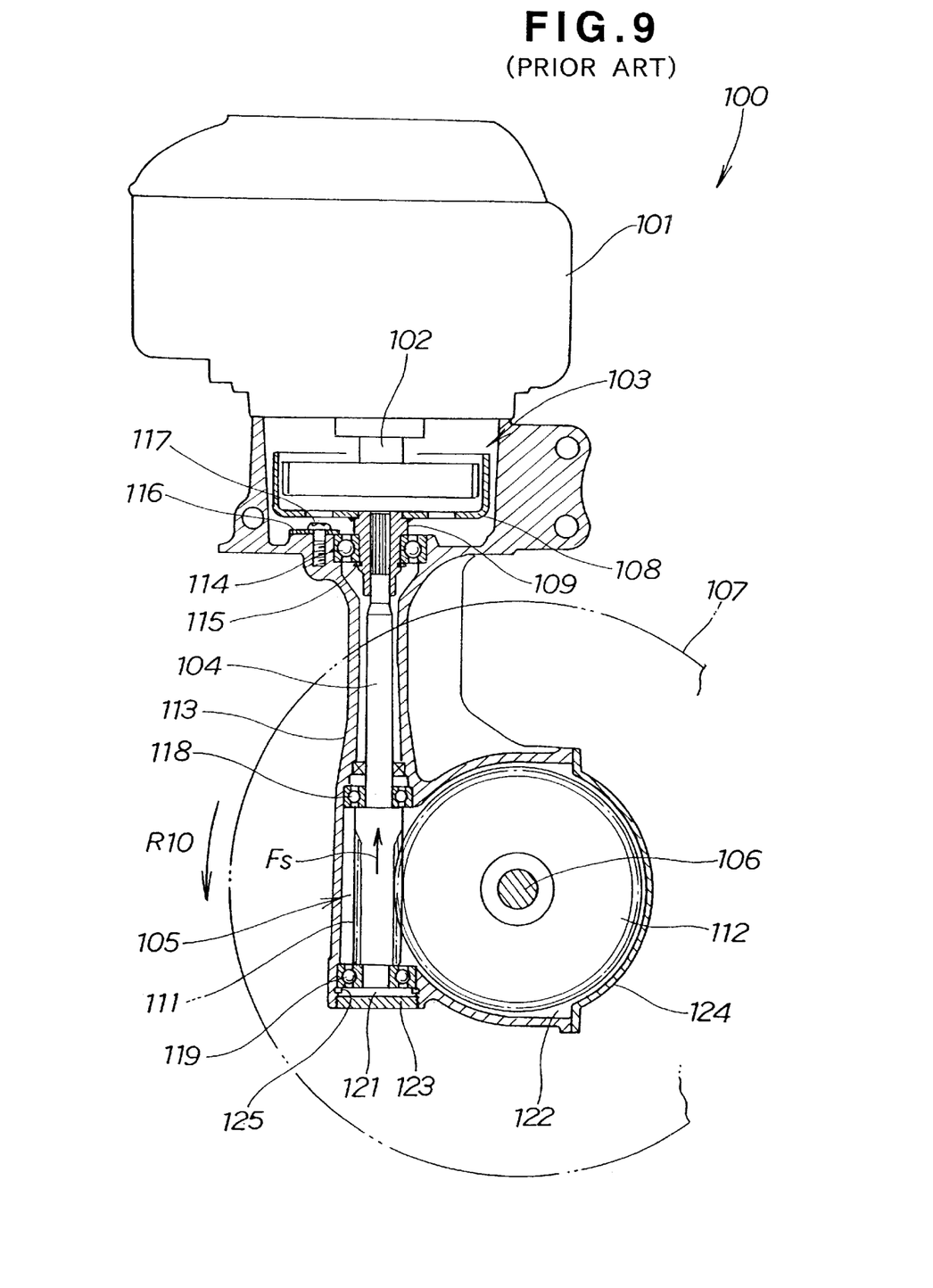
FIG. 9 is a schematic view of a conventional cultivator.

FIG. 9 is a schematic view of the conventionally-known cultivator 100, where an engine 101 capable of rotating only in one rotational direction has an output shaft 102 extending downward from the body of the engine 101. Transmission shaft 104 is coupled via a centrifugal clutch 103 to the output shaft 102, and a horizontal cultivating shaft 106 having a plurality of cultivating claws 107 is connected to the transmission shaft 104 via a worm gear mechanism 105.

The transmission shaft 104 is secured at its top to a hub 109 of an outer cup 108 of the centrifugal clutch 103 by spline coupling. The worm gear mechanism 105 includes a worm (driving gear) 111 provided on the transmission shaft 104, and a worm wheel (driven wheel) 112 provided on the cultivating shaft 106. The centrifugal clutch 103, transmission shaft 104 and worm gear mechanism 105 are together accommodated in a transmission casing 113. The transmission casing 113 supports, via a first rolling bearing 114, the outer cup hub 109 against axial displacement. Specifically, the first rolling bearing 114 has an inner race secured via a retaining ring 115 to the hub 109 against axial displacement, and an outer race secured via a retaining plate 116 and retaining screw 117 to the hub 109 against axial displacement. Further, the transmission casing 113 supports, via second and third rolling bearings 118 and 119, the transmission shaft 104 against axial displacement. Specifically, the second and third rolling bearings 118 and 119 are held against axial displacement, by means of a retaining ring 125 and stepped portions defined between the transmission shaft 104 and the worm 111 and defined in the transmission casing 113.

The transmission casing 113 has a first opening 121 formed at its lower end for insertion therein of the transmission shaft 104 and worm 111, as well as a second opening 122 formed at its side end for insertion therein of the worm wheel (driven gear) 112. After the transmission shaft 104 and worm 111 are inserted through the first opening 121 into the transmission casing 113 and fixed in place within the transmission casing 113, the first opening 121 is closed with a first lid 123. Similarly, after the worm wheel 112 is inserted through the second opening 122 into the transmission casing 113 and fixed in place within the transmission casing 113, the second opening 122 is closed with a second lid 124.

In the conventional cultivator 100 of FIG. 9, the cultivating shaft 106 and worm wheel 112 are each constructed to rotate only in a forward rotational direction R10 (counterclockwise direction in the figure), so that the worm wheel 112 would produce thrust reaction force Fs acting on the transmission shaft 104 via the worm 111 in a direction toward the centrifugal clutch 103. The thrust reaction force Fs is applied via the second rolling bearing 118 to the transmission casing 113.

However, the conventional cultivator 100 of FIG. 9, which employs the retaining ring 115, retaining plate 116 and retaining screw 117 to prevent the outer cup 24 and first rolling bearing 114 from accidentally coming off or getting disengaged from the transmission casing 113, undesirably requires a great number of necessary component parts, lowers the manufacturing (component-part-installing) efficiency and increases the necessary number of man-hours. Particularly, where the cultivator 100 is of a small size, such inconveniences would become more notable because the component parts have to be assembled and installed in a very narrow space within the small-size transmission casing 113.

Further, because the transmission casing 113 in the conventional cultivator 100 has the first and second openings 121 and 122 oriented in different directions, two separate lids 123 and 124 are required to close the respective openings 121 and 122, which further increases the number of necessary component parts, lowers the manufacturing (component-part-installing) efficiency and increases the necessary number of man-hours. Moreover, in the conventional cultivator 100, the worm 111 and worm wheel 112 are inserted into the transmission casing 113 in two different directions, which would even further lower the manufacturing (component-part-installing) efficiency. Besides, because the retaining ring 125 is employed to prevent the coming-off or disengagement, from the transmission casing 113, of the worm 111, the number of necessary component parts would increase even further.

SUMMARY OF THE INVENTION

In view of the foregoing prior art problems, it is an object of the present invention to provide a novel technique suitably applicable to a cultivator of a type where a main shaft portion of a transmission shaft, having a driving gear provided thereon, is connected, via a clutch, to an engine rotatable only in one rotational direction, and which, with a reduced number of component parts, allows the clutch and first bearing, supporting the clutch, to be efficiently installed in a transmission casing against accidental coming-off from the transmission casing.

It is another object of the present invention provide a novel technique suitably applicable to a cultivator of a type where a worm is operatively connected, via a main shaft portion of a transmission shaft, to an engine rotatable only in one rotational direction and the worm, worm wheel and main shaft portion are collectively accommodated in a transmission casing, and which, with a reduced number of component parts, allows the worm, worm wheel and main shaft portion to be efficiently installed in the transmission casing against accidental coming-off from the transmission casing.

In order to accomplish the above-mentioned objects, the present invention provides an improved cultivator which comprises: an engine capable of rotating only in one predetermined rotational direction; a transmission shaft having a driving gear provided thereon, the transmission shaft having a main shaft portion that is smaller in diameter than the driving gear and projecting from one end of the driving gear toward a clutch, the main shaft portion being operatively connected to the engine via the clutch; a cultivating shaft having cultivating claws and also having a driven gear provided thereon to meshingly engage with the driving gear; and a transmission casing having the driven gear, driving gear, main shaft portion of the transmission shaft and clutch collectively accommodated therein, the transmission casing having a first bearing for preventing the clutch from being displaced toward the driving gear and a second bearing for preventing the driving gear from being displaced toward the clutch. In the present invention, the main shaft portion of the transmission shaft is screw-coupled to the clutch and a direction in which the screw-coupling between the main shaft portion and the clutch is tightened corresponds to the one predetermined rotational direction of the engine.

The first bearing prevents the clutch from being displaced toward the worm while the second bearing prevents the worm from being displaced toward the clutch, and the main shaft portion is screw-coupled to the clutch. Thus, in the present invention, the clutch, main shaft portion and first and second bearings can be reliably prevented from displacement toward the driving gear and the driving gear can be prevented from displacement toward the clutch, with a simple structure comprising only the first and second bearings. Therefore, the present invention can eliminate the need to provide separate elements for preventing undesired displacement and disengagement, from the transmission casing, of the above-mentioned component parts. As a result, it is possible to not only reduce the number of necessary component parts but also enhance the component-part-installing efficiency, thereby minimizing the necessary number of man-hours. Furthermore, with the arrangement that the direction in which the screw-coupling between the main shaft portion and the clutch is tightened corresponds to the one rotational direction of the engine, there is no possibility of the screw-coupling gradually loosening due to the rotation of the engine.

In an embodiment of the present invention, the transmission shaft has an end shaft portion projecting from the other end of the driving gear opposite from the main shaft portion, and the end shaft portion has an adjustment section for adjusting an amount of screwing, into the clutch, of the main shaft portion of the transmission shaft. The provision of the adjustment section allows the amount of screwing, into the clutch, of the main shaft portion to be adjusted as desired with ease.

Preferably, the driving gear provided on the transmission shaft is a worm while the driven gear provided on the cultivating shaft is a worm wheel, and the transmission casing has a single insertion opening for insertion therein of the worm and worm wheel and the insertion opening is closed with a single lid. The lid constructed to also function as a member for preventing the worm from accidentally coming off or getting disengaged from the transmission casing. Thus, the present invention requires only one lid to close the insertion opening, so that it can significantly reduce the number of component parts as compared to the conventional cultivator where a plurality of insertion openings are closed with a plurality of lids. Further, because the worm and worm wheel are inserted and installed in the transmission casing in one direction, the present invention can enhance the component-part-installing efficiency. In addition, with the lid constructed to also function to prevent accidental coming-off of the worm, the present invention can eliminate the need for a separate element for preventing the coming-off of the worm. Thus, it is possible to further reduce the number of necessary component parts and enhance the component-part-installing efficiency.

Preferably, the end shaft portion of the transmission shaft is held via a third bearing within the transmission casing, and the lid is a press-formed lid integrally having a flange that is secured to an edge of the transmission casing defining the insertion opening and that supports the end surface of the third bearing. With the lid's flange secured to the edge defining the insertion opening and also functioning to support the end surface of the third bearing to thereby prevent the third bearing from accidentally coming off the transmission casing, the present invention can eliminate the need for a separate retaining member for preventing the third bearing from coming off the transmission casing. Because the separate retaining member can be dispensed with, the present invention can even further reduce the number of necessary component parts and enhance the component-part-installing efficiency, thereby minimizing the necessary number of man-hours. In addition, the lid, simply press-formed to provide the flange, can advantageously function to reliably prevent the third bearing from accidentally coming off the transmission casing.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
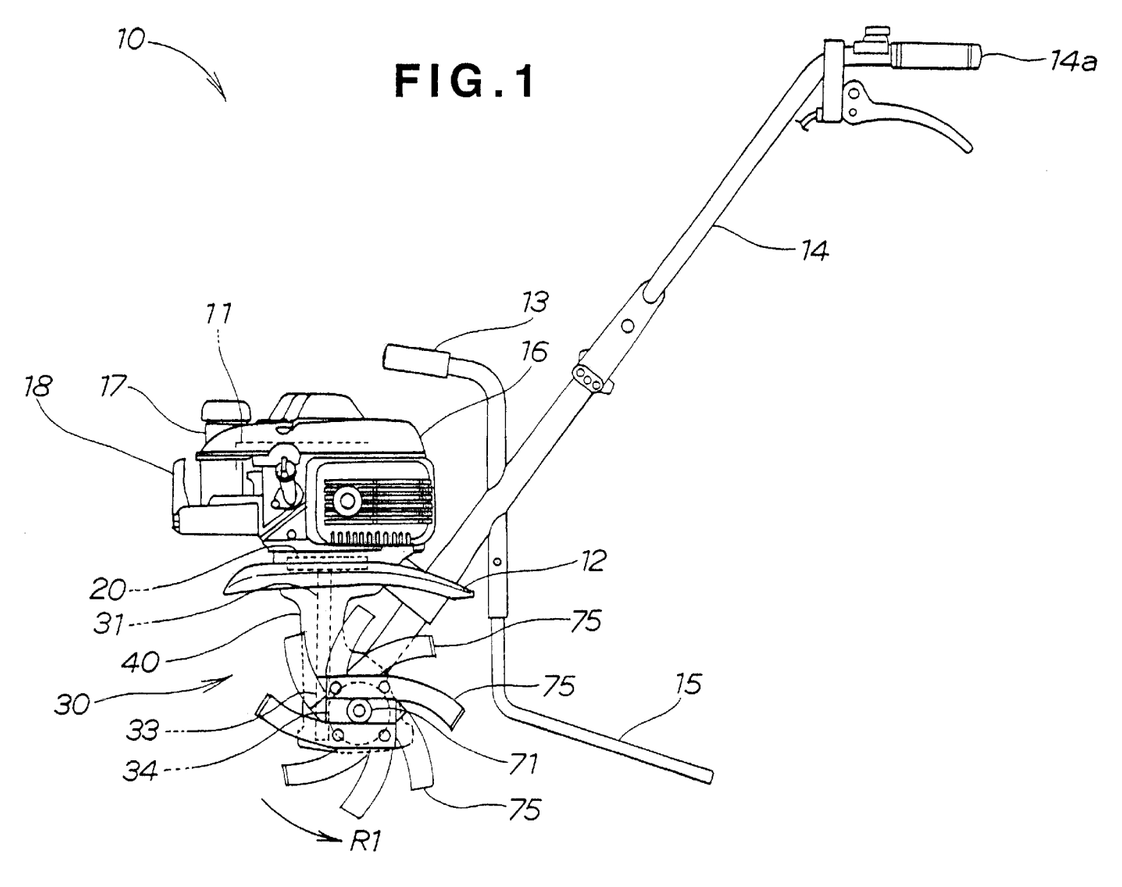
FIG. 1 is a left side view of a cultivator in accordance with en embodiment of the present invention.

Initial reference is taken to FIG. 1 which is a left side view of a cultivator in accordance with en embodiment of the present invention. This cultivator 10 includes an engine 11 as its driving power source, driving power of which is transmitted to a cultivating shaft 71 via a clutch 20 and transmission mechanism 30. Through rotations of a plurality of cultivating claws 75 provided on the cultivating shaft 71, the cultivator 10 can not only cultivate the ground but also travel in directions instructed by a human operator.

Fender 12 is provided above the cultivating claws 75 to function as a cover for preventing scattering of earth and sand. Namely, the cultivator 10 is constructed as a "walking-type, self-propelled, front-tine cultivating machine".

The engine 11 has an output shaft (crankshaft) extending generally in a vertical direction and is capable of rotating only in one rotational direction. With the power transmitted from the engine 11, the cultivating shaft 71 and cultivating claws 75 rotate in a forward direction R1 (counterclockwise direction in FIG. 1), i.e. in a direction generally corresponding to a forward traveling direction Ru of the cultivator 10.

The cultivator 10 is of an extremely small size such that a human can readily carry it by gripping a carrying handle 13 with a single hand, and it includes at least one operating handle 14 extending rearward and upward from a rear portion of the transmission casing 40 and a resistance bar 15 extending downward from a lower portion of the operating handle 14. In use, the resistance bar 15 is inserted in the earth to set a cultivating amount (depth) by the claws 75 and also impart resistance to traction force applied by the claws 75.

Further, in the figure, reference numeral 14a represents a grip, 16 an engine cover, 17 a fuel tank, and 18 a body guard (protector).

Figure 2:
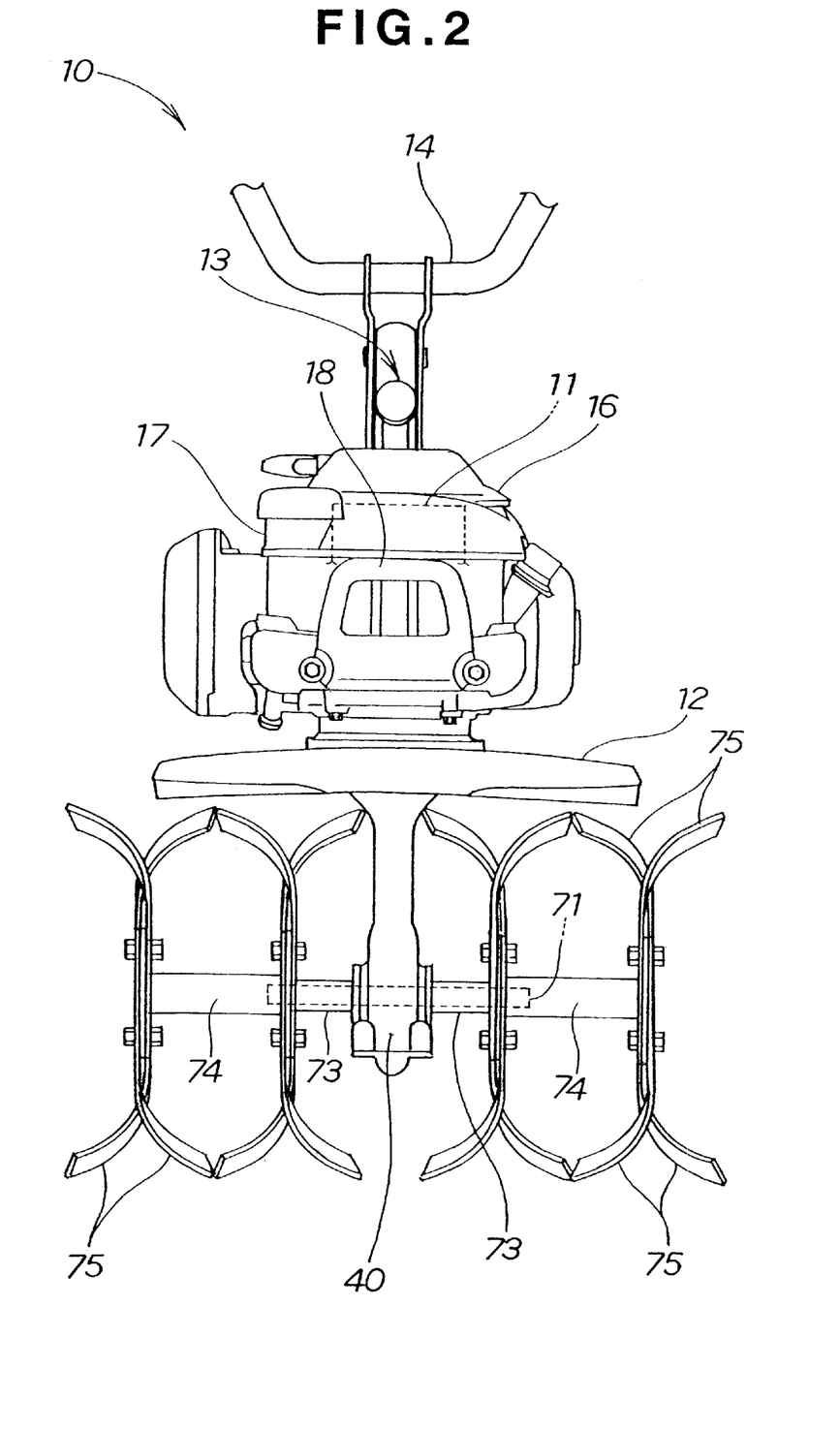
FIG. 2 is a front view of the cultivator of the present invention.

FIG. 2 is a front view of the cultivator 10 of the present invention, which particularly shows the cultivating shaft 71 projecting horizontally laterally from the transmission casing 40 in a widthwise direction of the body of the cultivator 10. As also seen in FIG. 2, left and right hollow shafts 73 and 74 extend from left and right end portions, respectively, from the cultivating shaft 71 in partly-overlapped relation to the left and right end portions, and the plurality of cultivating claws 75 are fixedly mounted on these left and right hollow shafts 73 and 74. The fender 12 has a width greater than that of the engine 11 but smaller than a distance between the leftmost cultivating claw 75 and the rightmost cultivating claw 75.

Figure 3:
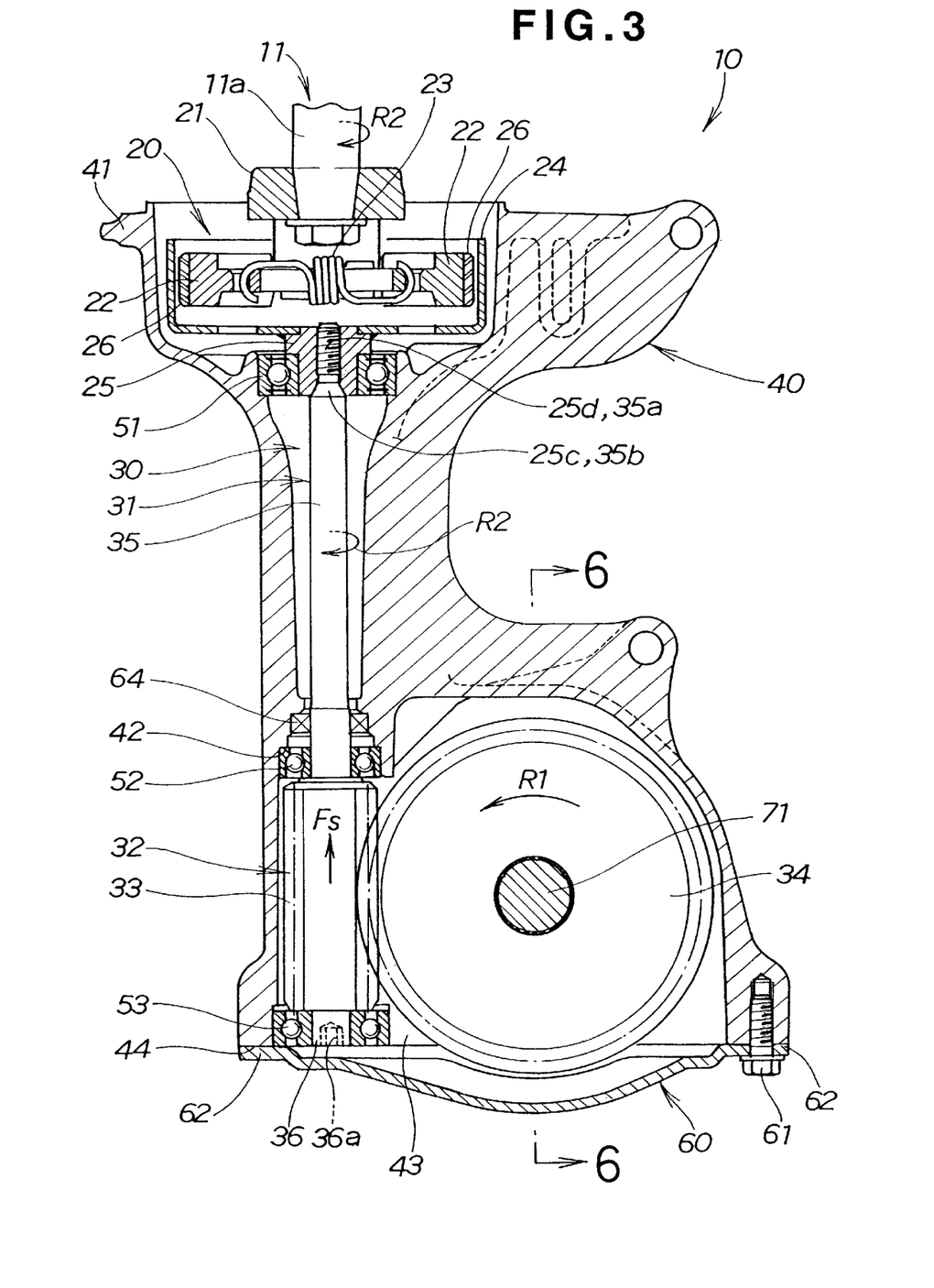
FIG. 3 is a sectional view of a transmission casing and other component parts adjoining the transmission casing in the cultivator.

FIG. 3 is a sectional view of the transmission casing 40 and other component parts adjoining the transmission casing 40, which particularly shows a sectional structure of the casing 40 and other component parts as taken from the left side of the cultivator 10 so as to correspond to FIG. 1.

The transmission casing 40 has an upper flange 41 bolted to a lower portion of the engine 11 disposed above the casing 40, and the clutch 20, transmission mechanism 30 and cultivating shaft 71 are collectively accommodated in the transmission casing 40.

The transmission mechanism 30 is connected via the clutch 20 to the output shaft (crankshaft) 11a extending downward from the body of the engine 11. The transmission mechanism 30 includes a substantially vertical transmission shaft 31 axially aligned with the output shaft 11a, and a worm gear mechanism 32 for transmitting driving power from the transmission shaft 31 to the horizontal cultivating shaft 71 to rotate the cultivating claws 75.

The worm gear mechanism 32 includes a worm 33 formed integrally with the transmission shaft 31 to function as a driving gear, and a worm wheel 34 spline-coupled to the cultivating shaft 71 to function as a driven gear.

Namely, in the cultivator 10, the worm wheel 34, meshingly engaging with the worm 33, is provided on the cultivating shaft 71, a main shaft portion 35 of the transmission shaft 31 projects upwardly from one or upper end of the worm 33 and is operatively coupled via the clutch 20 to the engine 11, and the worm 33, worm wheel 34 and main shaft portion 35 of the transmission shaft 31 are together accommodated in the transmission casing 40. Further, the transmission shaft 31 has a lower end shaft portion 36 extending from the other or lower end of the worm 33 (opposite from the main shaft portion 35), and the main shaft portion 35 and end shaft portion 36 each have a diameter smaller than that of the worm 33.

This and following paragraphs describe details of the clutch 20, which is preferably a centrifugal clutch that is activated to transmit rotations of the engine 11 to the transmission shaft 31 by centrifugal force once the number of rotations of the engine 11 has increased to a predetermined value or over. The centrifugal clutch 20 includes a driving member 21 secured to the lower end of the output shaft 11a of the engine 11, a pair of left and right centrifugal weights 22 radially opposed to each other and attached to the driving member 21 for reciprocating movement in a radial direction of the clutch 20, a spring 23 normally resiliently urging the centrifugal weights 22 toward each other, i.e. toward a radial center of the clutch 20, and an outer cup (driven member) 24 having the centrifugal weights 22 accommodated therein and secured to an upper end portion of the main shaft portion 35. The outer cup 24 is a driven member having a hub 25 integrally secured to its diametric center, where the hub 25 is rotatably attached to the transmission casing 40 via a first bearing 51.

The hub 25 of the outer cup 24 is screw-coupled with one (upper) end portion of the main shaft portion 35, and a direction in which the screw-coupling between the hub 25 and the main shaft portion 35 is tightened corresponds to the only rotational direction R2 of the engine 11. Therefore, there is no possibility of the screwed coupling, between the hub 25 and the main shaft portion 35, gradually loosening as the engine 11 rotates. The (lower) end shaft portion 36 of the main shaft portion 35 has an adjustment section 36a for adjusting an amount of screwing, into the clutch 20, of the transmission shaft 31. Specifically, the adjustment section 36a is in the form of a wrench hole formed in the bottom end surface of the end shaft portion 36.

Once the number of rotations of the engine 11 has increased to the predetermined value or over, the centrifugal force applied to the centrifugal weights 22 becomes greater than the resilient urging force of the spring 23 to thereby press friction plates 26 against the inner circumferential surface of the outer cup 24, so that the driving power from the engine 11 can be transmitted to the outer cup 24.

In the transmission casing 40, the first (upper) bearing 51 prevents the clutch 20 from being displaced toward the worm 33. The transmission casing 40 also includes a second (intermediate) bearing 52 for preventing the worm 33 from being displaced toward the clutch 20, and a third (lower) bearing 53 for supporting the (other or lower) end shaft portion 36.

As stated above, the cultivating shaft 34 and worm wheel 34 are rotated in the forward rotational direction R1 (counterclockwise direction in the figure). This means that the worm wheel 33, transmission shaft 31, clutch 20 and output shaft 11a of the engine 11 for rotating the worm wheel 11 all rotate in the forward rotational direction R2 (clockwise direction in the figure). In this manner, the direction in which the screw-coupling, to the clutch 20, of the transmission shaft 33, i.e. main shaft portion 35, is tightened can be set to coincide with the only rotational direction R2 of the engine 11.

Further, the worm wheel 34, which rotates in the forward rotational direction R1, would produce thrust reaction force Fs acting on the transmission shaft 31 via the worm 33 in a direction toward the centrifugal clutch 20. The transmission shaft 31 rotates only in the direction R2 where it is subjected to the thrust force Fs.

The first or upper bearing 51 is a rolling ball bearing, such as a deep-groove ball bearing, which is subjected to only a radial load from the outer cup 24 without undergoing the thrust reaction force Fs.

The second or intermediate bearing 52 is a rolling ball bearing, such as an angular ball bearing, which is subjected to both a radial load from the transmission shaft 31 and the above-mentioned thrust reaction force Fs. Inner race of the second bearing 52 has a bottom surface abutting against the upper end surface of the worm 33 while an outer race of the second bearing 52 has a top surface abutting against a stepped portion of the transmission casing 40, so that the second bearing 52 can rotatably hold the main shaft portion 52 while reliably preventing the displacement, toward the clutch 20, of the transmission shaft 31 and worm 33.

The third or lower bearing 53 is a rolling ball bearing, such as a deep-groove ball bearing, which is subjected to only a radial load from the transmission casing 31 without undergoing the thrust reaction force Fs. Inner race of the third bearing 53 has an upper surface abutting against the lower end surface of the worm 33 and can rotatably hold the end shaft portion 36 of the transmission shaft 31. More details of the first or upper bearing 51 will be discussed later. In the figure, reference numeral 54 represents an oil seal.

The transmission casing 40 has a single insertion opening 43, formed in its lower end surface 44 opposite from the clutch 20 and communicating with a lower hollow space thereof, for insertion and installation therein of the transmission shaft 31, worm 33, worm wheel 34, second bearing 52, third bearing 53 and oil seal 54. The opening 43 is closed with a single lid 60 that is constructed to also function as a member for preventing the worm 33 from accidentally coming off or getting disengaged from the transmission casing 40. The lid 60 is not subjected to the above-mentioned thrust reaction force Fs and therefore may be of small rigidity; thus, in the instant embodiment, the lid 60 is press-formed of a steel plate. This lid 60 has a flange 62 that is secured, by a bolt 61, to an edge of the transmission casing 40 defining the insertion opening 43. The flange 62 can support the lower end surface of the outer race of the third bearing 53. Therefore, there is no need to provide a separate retaining ring for retaining the third bearing 53 within the transmission casing 40.

Further, the thrust reaction force Fs applied from the worm 33 to the transmission shaft 31 is directed upward toward the clutch 20; namely, the third or lower bearing 53 is not subjected to, i.e. not influenced by, the thrust reaction force Fs. Therefore, it is not necessary to support the entire lower end surface of the outer race of the third bearing 53 by means of the flange 62 of the lid 60; that is, it suffices to just support a part of the lower end surface of the outer race of the third bearing 53 by means of the flange 62.

The provision of the lid 60 can prevent the transmission shaft 31, worm 33 and third bearing 53 from accidentally coming off the transmission casing 40. Thus, no separate retaining member is necessary, which can reduce the number of necessary component parts but enhance the component-part-installing efficiency, thereby minimizing the necessary number of man-hours. In addition, by simply press-forming the lid 60 to provide the flange 62, the lid 60 is allowed to also function to prevent accidental coming-off of the third bearing 53.

Figure 4:
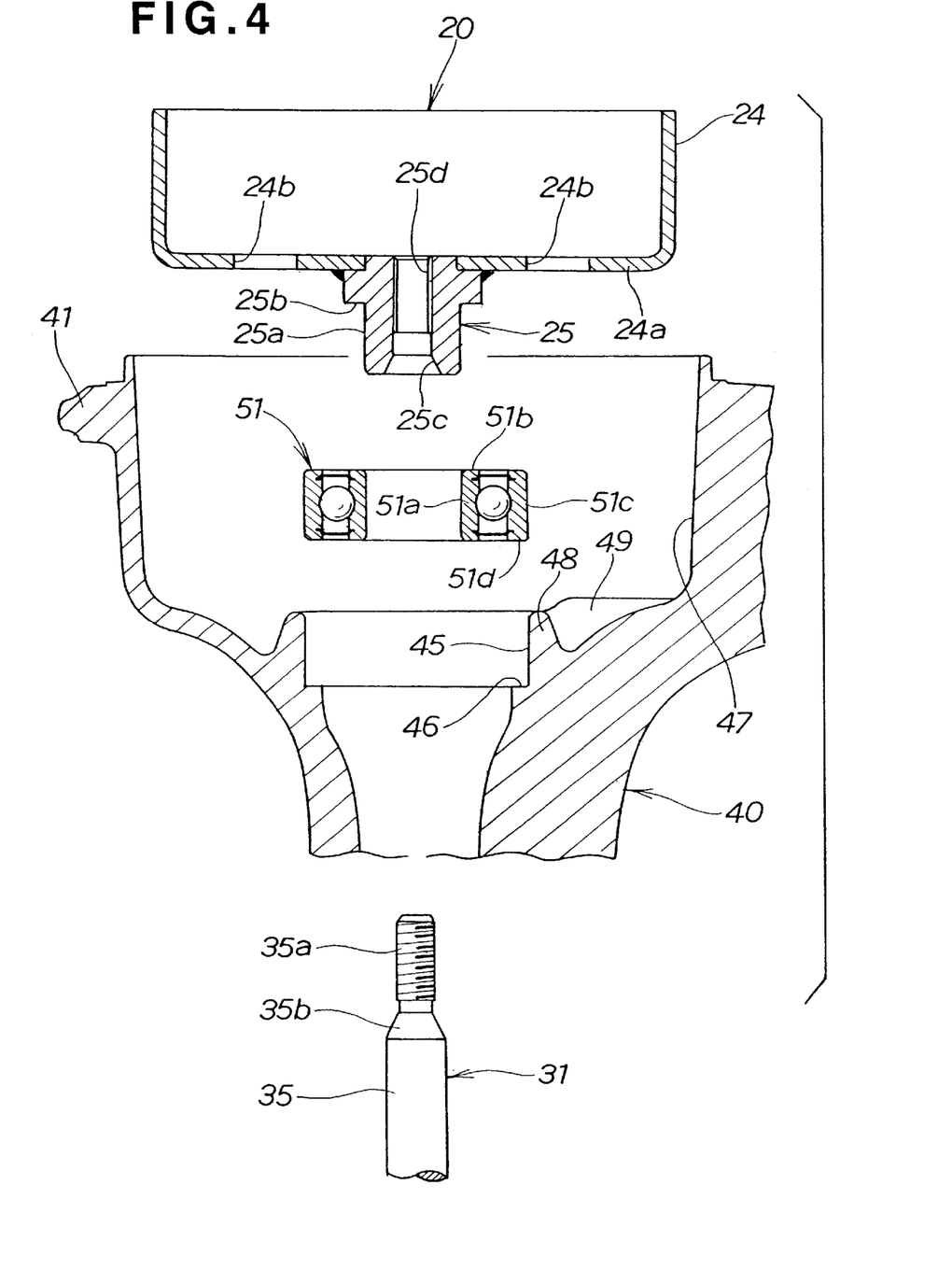
FIG. 4 is an exploded view showing relationships among a clutch, transmission shaft, first bearing and transmission casing in the cultivator.

FIG. 4 is an exploded view showing structural and operational relationships among the clutch 20, transmission shaft 31, first bearing 51 and transmission casing 40.

The first bearing 51 is a sealed bearing, where the inner race 51a is fitted over the outer peripheral surface 25a of the hub 25 with the upper end surface 51b of the inner race 51a abutting against a stepped surface 25b and the outer race 51c is fitted in a retaining hole 45 of the transmission casing 40 with a lower end surface 51d abutting against a stepped bottom surface 46 of the retaining hole 45. In this manner, the first bearing 51 rotatably holds the outer cup 24 while preventing the outer cup 24 from being displaced toward the worm 33 (see FIG. 3).

The outer cup 24 of the clutch 20 has a plurality of jig inserting holes 24b formed vertically through a bottom wall 24a thereof. The transmission casing 40, on the other hand, has a ring-shaped or cylindrical portion 48 formed within a clutch-receiving portion 47 thereof and projecting upward from the stepped bottom surface 46 to define the above-mentioned retaining hole 45. A plurality of radial ribs 49 are formed on the outer periphery of the cylindrical portion 48 and are each in the form of a vertical wall. Relationship between the jig inserting holes 24b and the ribs 49 will be later described in detail in relation to FIG. 5.

This and following paragraphs describe the screw-coupling, to the hub 25, of the main shaft portion 35 of the transmission shaft 31. The hub 25 has a female tapering portion 25c formed at its lower end facing the main shaft portion 35, and a female (internal) thread region 25d vertically extending above the female tapering portion 25c. Namely, the female tapering portion 25c tapers toward the lower end of the female thread region 25d. On the other hand, the main shaft portion 35 has a male (external) thread region 35a formed at its upper end and a male tapering portion 35b vertically extending below the male tapering portion 35a. Namely, the male tapering portion 35b tapers toward the lower end of the male thread region 35a.

By screwing the male thread region 35a of the main shaft portion 35 into the female thread region 25d of the hub 25, the main shaft portion 35 can be screw-coupled to the hub 25. Further, by fitting the male tapering portion 35b in the female tapering portion 25c, it is possible to prevent the main shaft portion 35 from shaking relative to the hub 25.

Figure 5A:
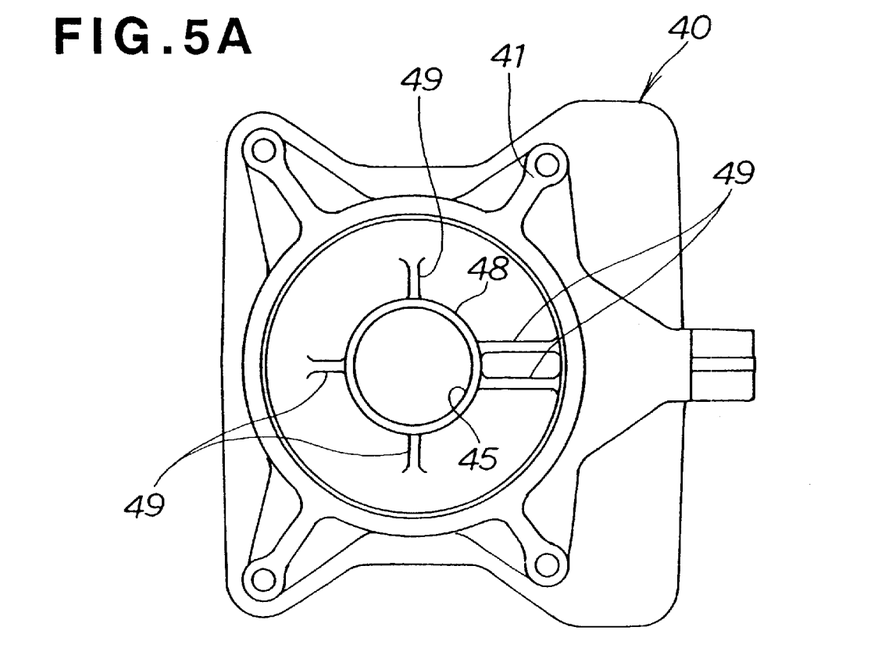
FIGS. 5A and 5B are views explanatory of structural and operational relationships between the transmission casing and outer cup of the clutch.
Figure 5B:
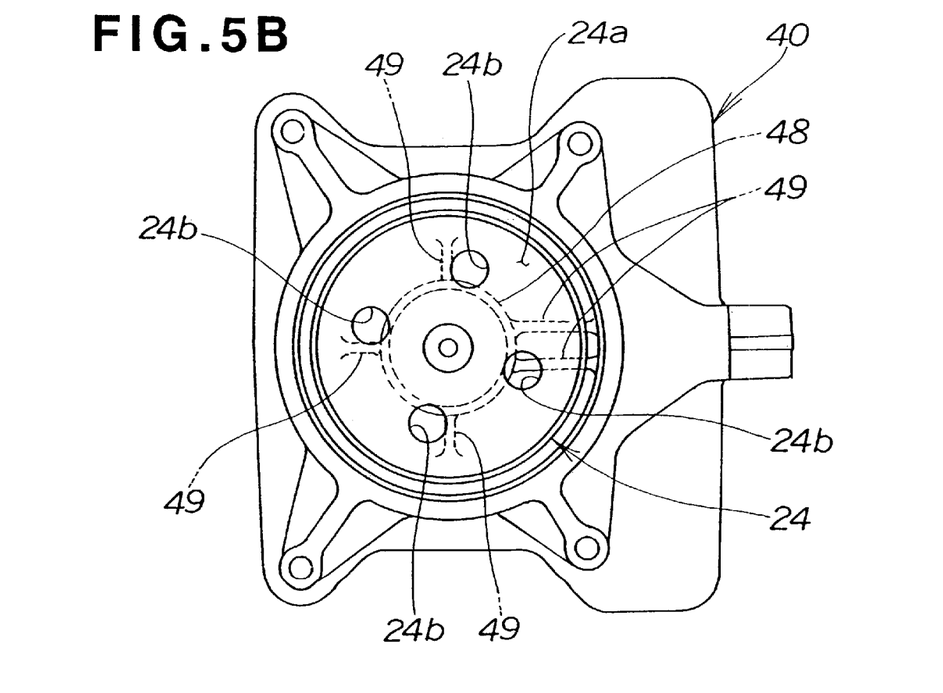

FIGS. 5A and 5B are views explanatory of structural and operational relationships between the transmission casing 40 and the outer cup 24 of the clutch 20. More specifically, FIG. 5A is a plan view of the transmission casing 40, which particularly shows example arrangement or layout of the plurality of ribs 49 extending radially from the inner cylindrical portion 48 of the transmission casing 40. FIG. 5B is a plan view of the transmission casing 40 with the outer cup 24 inserted therein, which particularly shows positions of the jig inserting holes 24b of the outer cup 24 relative to the ribs 49 of the transmission casing 40.

By positioning the jig inserting holes 24b in alignment with corner portions defined between the outer peripheral surface of the cylindrical portion 48 and the ribs 49 and engaging jigs in the respective corner portions from above, the outer cup 24, which is otherwise rotatable relative to the transmission casing 40, can be reliably prevented from undesired rotation.

Figure 6:
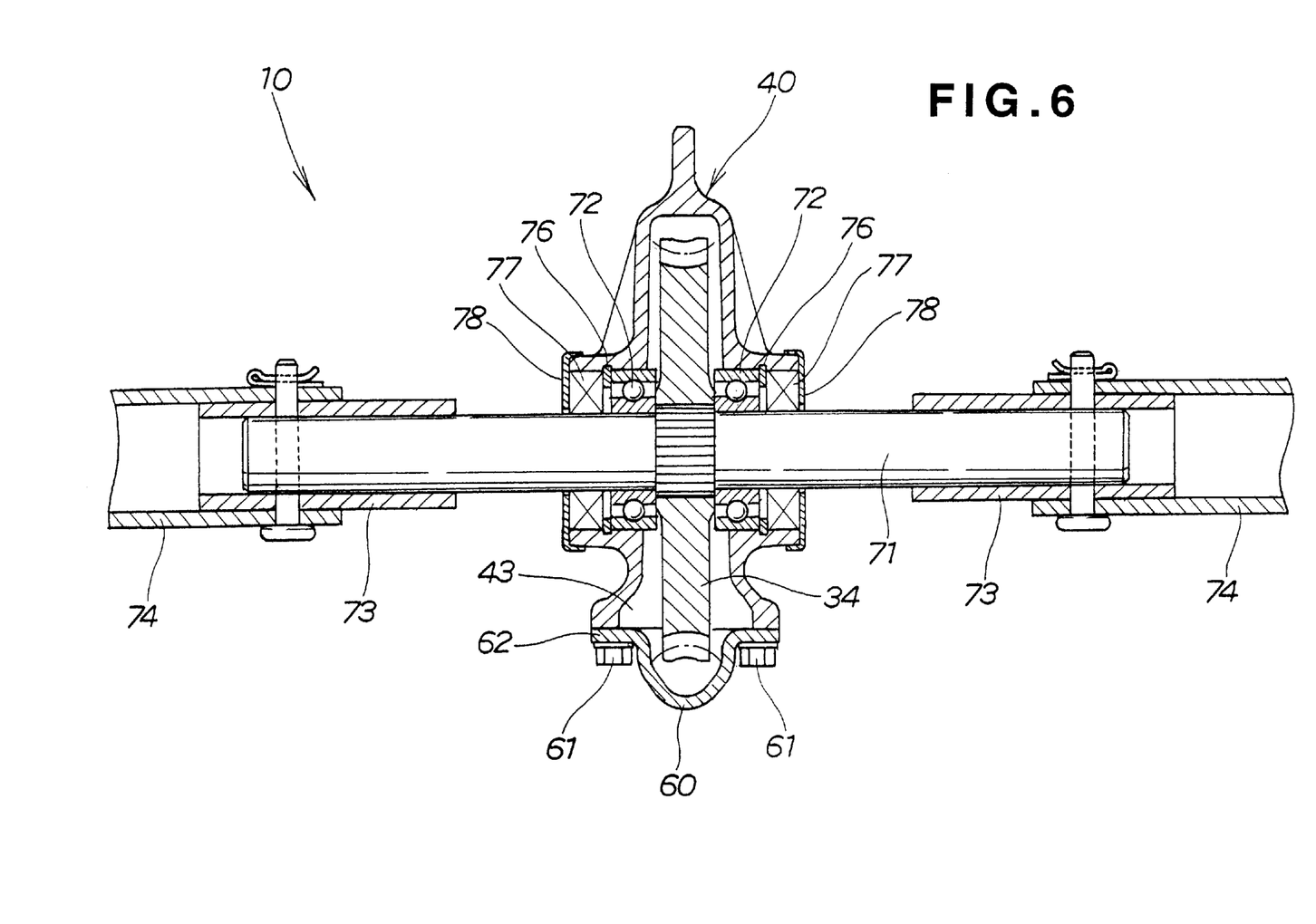
FIG. 6 is a sectional view taken along the 6—6 line of FIG. 3.

FIG. 6 is a sectional view taken along the 6—6 line of FIG. 3, which shows that the cultivating shaft 71 having the worm wheel 34 provided thereon is rotatably supported in the transmission casing 40 via left and right bearings 72 that are preferably rolling bearings. The left and right hollow shafts 73 and 74 are coupled to the opposite end portions of the cultivating shaft 71 projecting laterally leftward and rightward through the transmission casing 40. In the figure, each reference numeral 76 represents a retaining ring, 77 an oil seal, and 78 a cap.

Figure 7:
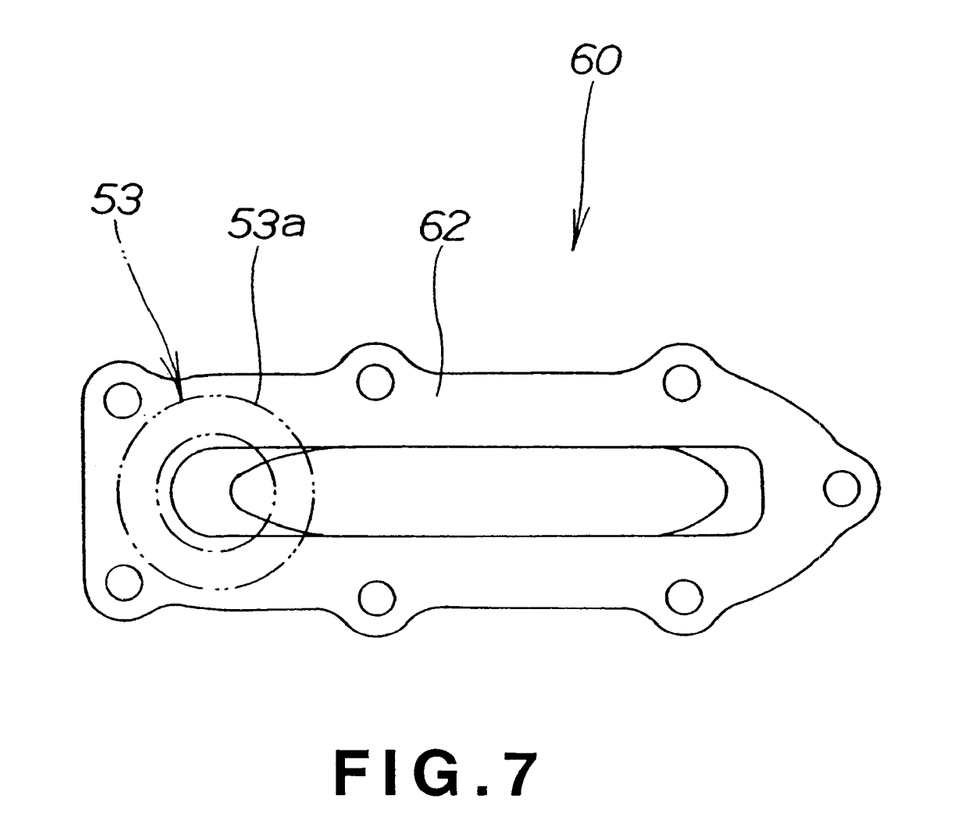
FIG. 7 is a plan view of a lid closing an insertion opening of the transmission casing.

FIG. 7 is a plan view of the lid 60, which particularly shows that the lower end surface of the outer race 53a (denoted by phantom lines) is partly supported in place by the flange 62 of the lid 60.

Figure 8:
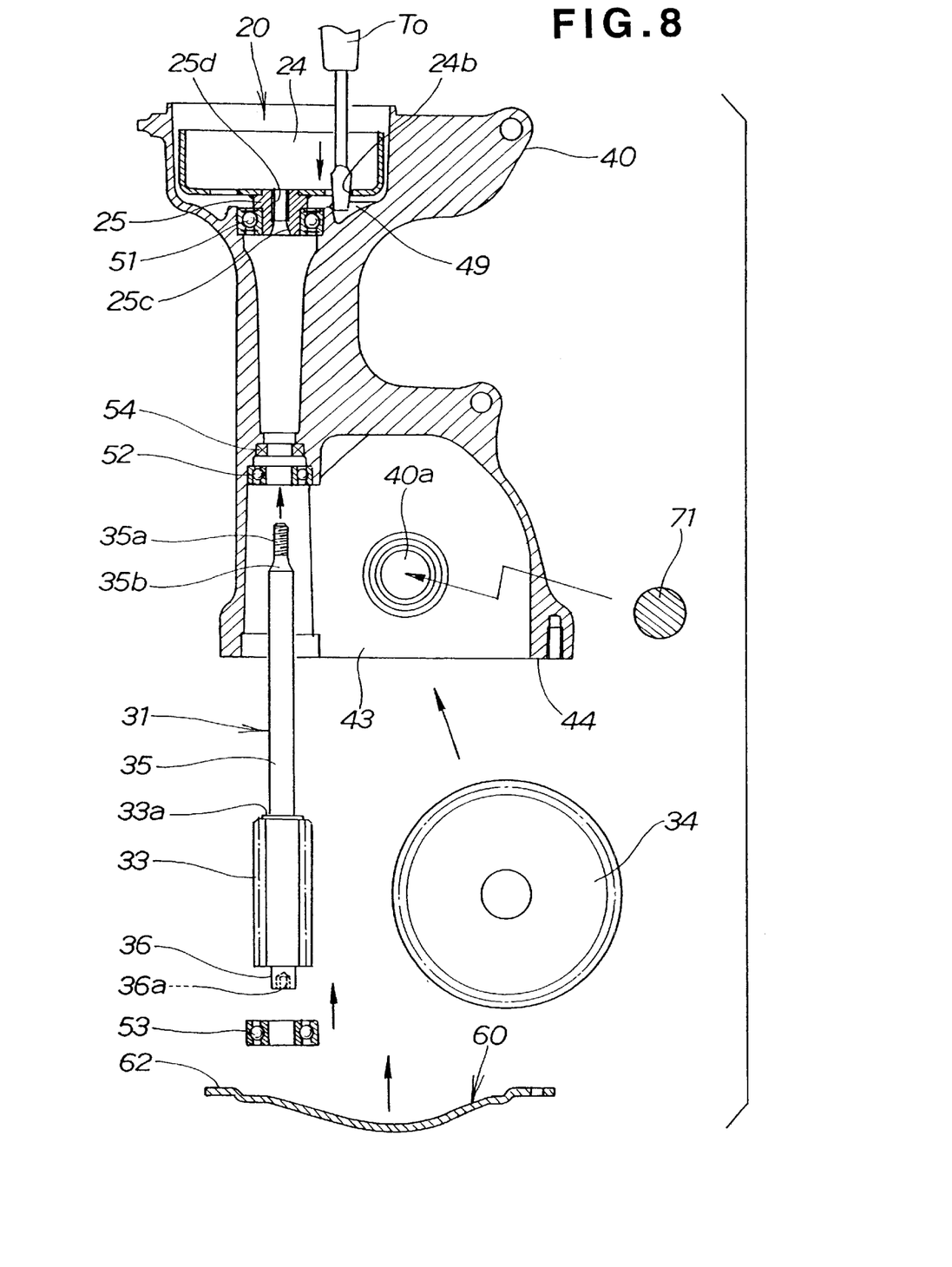
FIG. 8 is a sectional view explanatory of an example manner in which the clutch, transmission mechanism and transmission casing are assembled together in the cultivator.

Next, a description will be given about an example manner in which the clutch 20, transmission mechanism 30 and transmission casing 40 are assembled together, with reference to FIGS. 3, 4, 6 and 8. FIG. 8 is a sectional view explanatory of the manner in which the clutch 20, transmission mechanism 30 and transmission casing 40 are assembled together in the instant embodiment. Note that the manner to be explained here is just illustrative and the present invention is not so limited.

First, the inner race 51a of the first or upper bearing 51 is fitted into the outer cup's hub 25 of the clutch 20, as shown in FIG. 4. Then, the outer cup 24 with the first or upper bearing 51 thus attached thereto is inserted into the clutch-receiving portion 47 from above the transmission casing 40 in such a manner that the outer race 51c of the first bearing 51 is fitted in the retaining hole 45. FIG. 8 shows the outer cup 24 and first bearing 51 having been installed in the transmission casing 40.

Then, the oil seal 54 and second bearing 52 are inserted through the insertion opening 43 and installed in the transmission casing 40. After that, the transmission shaft 31 is inserted through the insertion opening 43 of the transmission casing 40, and the male thread region 35a of the transmission shaft 31 is screwed into the female thread region 25d of the hub 25 to a certain extent with the outer cup 24 held by one of the hands of the human operator.

Then, rotation-preventing jigs To, such as drivers, are inserted through the jig inserting holes 24b until their tips abut against the corner portions, defined between the outer peripheral surface of the cylindrical portion 48 and the ribs 49, to thereby prevent accidental rotation of the outer cup 24. After that, the male thread region 35a of the transmission shaft 31 is firmly or fully screwed into the female thread region 25d of the hub 25 with the outer cup 24 held to not rotate. Specifically, the male thread region 35a is firmly or fully screwed into the female thread region 25d by means of a not-shown hex (hexagonal) wrench inserted in the adjustment section 36a (wrench hole). Upon completion of the screwing, the rotation-preventing jigs To and hex wrench are removed.

Note that, because the individual component parts have their own manufacturing tolerance, a distance between the first or upper bearing 51 and the second or intermediate bearing 52 is determined depending on the respective manufacturing tolerance of the bearings 51 and 52. Similarly, distances between the second bearing 52 and the female tapering portion 25c and between the upper end surface 33a of the worm 33 and the male tapering portion 35d are determined depending on the respective manufacturing tolerance of the component parts. Therefore, the male thread region 35a is screwed into the female thread region 25d until the upper end surface 33a of the worm 33 abuts against the lower end surface of the inner race of the second bearing 52.

After that, the worm wheel 34 is inserted through the insertion opening 43 into the transmission casing 40, and the cultivating shaft 71 is inserted through side shaft holes 40a to project laterally from the transmission casing 40, after which the worm wheel 34 is fastened in place.

Then, as shown in FIG. 6, the left and right bearings 72 are attached to the cultivating shaft 71, and the worm wheel 34 is brought into meshing engagement with the worm 33 (see FIG. 8). After that, the oil seals 77 and caps 78 are attached.

After that, the third or lower bearing 53 is attached to the end shaft portion 36 of the transmission shaft 31 and to the transmission casing 40. Finally, the insertion opening 43 of the transmission casing 40 is closed with the lid 60, and thus the operations for assembling the outer cup 24, transmission mechanism 30 and cultivating shaft 71 onto the transmission casing 40 are completed. The component parts thus completely assembled are illustrated in FIG. 3.

In the completely-assembled state, the first bearing 51 prevents the outer cup 24 of the centrifugal clutch 20 from being axially displaced toward the worm 33, and the second bearing 52 prevents the worm 33 from being axially displaced toward the centrifugal clutch 20. The main shaft portion 35, which is not movable toward the centrifugal clutch 20, is screw-coupled to the outer cup 24 that is not movable toward the worm 33. In this way, the outer cup 24 can be prevented from being displaced toward the worm 33 while the main shaft portion 35, worm 33, first bearing 51 and second bearing 52 can be prevented from being displaced toward the centrifugal clutch 20.

Thus, the described embodiment can eliminate the need to provide separate elements for preventing undesired displacement and coming-off, from the transmission casing 40, of the outer cup 24, main shaft portion 35, worm 33, first bearing 51 and second bearing 52. As a consequence, it is possible to not only reduce the number of necessary component parts but also enhance the component-part-installing efficiency, thereby minimizing the necessary number of man-hours. Particularly, in the case where the basic principles of the present invention are applied to an extremely-small-sized cultivator 10 capable of being carried with a single hand and thus the component parts are to be mounted in the small space within the transmission casing 40, extremely great advantageous results can be attained. Further, the adjustment section 36a, provided in the end shaft portion 36 of the transmission shaft 31, can readily adjust the amount of screwing, into the centrifugal clutch 20, of the main shaft portion 35.

Furthermore, the left and right centrifugal weights 22 of the centrifugal clutch 20 are operatively connected to the output shaft 11a of the engine 11. Namely, the upper flange 41 of the transmission casing 40 is bolted to a lower portion of the engine 11 with the centrifugal weights 22 received in the outer cup 24. In this manner, the centrifugal clutch 20, transmission mechanism 30, cultivating shaft 71 and transmission casing 40 can be readily assembled with respect to the engine 11.

Because the worm gear mechanism 32, main shaft portion 35 and outer cup 24, thus collectively accommodated in the transmission casing 40 in a partially assembled state, can be readily coupled to the engine 11, the assembling and installing operations of the cultivator 10 can be carried out with a significantly increased efficiency.

Moreover, in the described embodiment, the transmission casing 40 has only one insertion opening 43 for inserting the worm 33 and worm wheel 34 into the transmission casing 40, and this single opening 43 is closed with only one lid 60. Thus, the instant embodiment can significantly reduce the number of necessary component parts as compared to the conventional cultivator where a plurality of inserting openings are closed with a plurality of lids. In addition, with the only one insertion opening 43, the transmission casing 40 in the described embodiment can be considerably simplified in shape. Therefore, in a case where the transmission casing 40 is formed by casting, it suffices to provide a simple casting mold with a small number of mold-parting directions, and therefore it is possible to minimize the cost of the casting mold.

Furthermore, because the worm 33 and worm wheel 34 can be inserted and installed in the transmission casing 40 in one direction, the described embodiment can enhance the component-part-installing efficiency. In addition, with the lid 60 constructed to also function to prevent accidental coming-off of the worm 33, the described embodiment can eliminate the need for a separate element for preventing the coming-off of the worm 33. Thus, it is possible to enhance the component-part-installing efficiency while minimizing the number of necessary component parts.

It should be appreciated that the clutch 20 may be of any other suitable type than the centrifugal type. Further, the gear mechanism 32 for transmitting driving power from the transmission shaft 31 to the cultivating shaft 71 may be other than the worm gear mechanism, such as a bevel gear mechanism. In such a case, a driving bevel gear is provided on the transmission shaft 31 while a driven bevel gear is provided on the cultivating shaft 71. Furthermore, the adjustment section 36a may be in the form of a knob to be held by a hand or fingers, rather than the wrench hole for engagement with the hex wrench or the like.

In summary, according to the present invention, the first bearing prevents the clutch from being displaced toward the worm while the second bearing prevents the worm from being displaced toward the clutch, and the main shaft portion is screw-coupled to the clutch. Thus, in the present invention, the clutch, main shaft portion and first and second bearings can be reliably prevented from axial displacement toward the driving gear while the driving gear can be prevented from axial displacement toward the clutch, with a simple structure comprising only the first and second bearings. Therefore, the present invention can eliminate the need to provide separate elements for preventing undesired displacement and disengagement, from the transmission casing, of the above-mentioned component parts. As a result, it is possible to not only reduce the number of necessary component parts but also enhance the component-part-installing efficiency, thereby minimizing the necessary number of man-hours. Further, because the direction in which the screw-coupling between the main shaft portion and the clutch is tightened corresponds to the one rotational direction of the engine in the present invention, there is no possibility of the screw-coupling loosening due to the rotation of the engine.

Moreover, in the present invention, the transmission casing has a single insertion opening for insertion therein of the worm and worm wheel, and the insertion opening is closed with a single lid. The lid is constructed to also function as a member for preventing the worm from accidental coming-off from the transmission casing. Thus, the present invention can significantly reduce the number of necessary component parts as compared to the conventional cultivator where a plurality of insertion openings are closed with a plurality of lids. Further, because the worm and worm wheel are inserted and installed in the transmission casing in one direction, the present invention can enhance the component-part-installing efficiency. In addition, with the lid constructed to also function to prevent coming-off of the worm, the present invention can eliminate the need for a separate element for preventing the coming-off of the worm. Thus, it is possible to even further reduce the number of necessary component parts and enhance the component-part-installing efficiency.

The present disclosure relates to the subject matters of Japanese Patent Application Nos. 2002-045133 and 2002-045234, both filed Feb. 21, 2002, the disclosures of which are expressly incorporated herein by reference in their entireties.

What is claimed is:

1. A cultivator comprising:

an engine rotatable only in one rotational direction;

a transmission shaft having a driving gear provided thereon, said transmission shaft having a main shaft portion that is smaller in diameter than said driving gear and projecting from one end of said driving gear, said main shaft portion being operatively connected to said engine via a clutch;

a cultivating shaft having cultivating claws and a driven gear provided thereon, said driven gear meshingly engaging with said driving gear; and a transmission casing having said driven gear, said driving gear, the main shaft portion of said transmission shaft and said clutch collectively accommodated therein, said transmission casing including a first bearing for preventing said clutch from being displaced toward said driving gear and a second bearing for preventing said driving gear from being displaced toward said clutch, wherein the main shaft portion of said transmission shaft is screw-coupled to said clutch and a direction in which screw-coupling between the main shaft portion and said clutch is tightened corresponds to the one rotational direction of said engine.

2. A cultivator as claimed in claim 1 wherein said transmission shaft has an end shaft portion projecting from another end of said driving gear opposite from the main shaft portion, and the end shaft portion has an adjustment section for adjusting an amount of screwing, into said clutch, of the main shaft portion.

3. A cultivator as defined in claim 1 wherein said driving gear provided on said transmission shaft is a worm and said driven gear provided on said cultivating shaft is a worm wheel meshingly engaging with said worm, and wherein said transmission casing has a single insertion opening for inserting said worm and said worm wheel into said transmission casing and the insertion opening is closed with a lid, said lid also functioning as a member for preventing said worm from coming off said transmission casing.

4. A cultivator as claimed in claim 1 wherein the end shaft portion of said transmission shaft is held via a third bearing within said transmission casing, and wherein said lid is a press-formed lid integrally having a flange that is secured to an edge of said transmission casing defining the insertion opening and that supports an end surface of said third bearing.

* * * * *